(12) United States Patent
Løtveit

(10) Patent No.: US 7,013,548 B1
(45) Date of Patent: Mar. 21, 2006

(54) METHOD FOR INCREASING FRICTION BETWEEN WHEEL AND ROAD USING GLIDING PREVENTER

(75) Inventor: Bärd Løtveit, Klokkarstua (NO)

(73) Assignee: Autosock AS, Oslo (NO)

( * ) Notice: Subject to any disclaimer, the term of this patent is extended or adjusted under 35 U.S.C. 154(b) by 0 days.

(21) Appl. No.: 09/937,591

(22) PCT Filed: Apr. 6, 2000

(86) PCT No.: PCT/NO00/00113

§ 371 (c)(1), (2), (4) Date: Sep. 27, 2001

(87) PCT Pub. No.: WO00/59745

PCT Pub. Date: Oct. 12, 2000

(30) Foreign Application Priority Data

Apr. 6, 1999 (NO) .................. 991631

(51) Int. Cl.
*B60C 27/12* (2006.01)
*B60C 27/18* (2006.01)

(52) U.S. Cl. .......... 29/450; 152/208; 152/213 A; 152/219; 152/221; 156/110.1

(58) Field of Classification Search ........... 152/154.2, 152/208, 213 R, 213 A, 219, 221; 206/304.1; 29/450, 426.6, 434; 156/110.1
See application file for complete search history.

(56) References Cited

U.S. PATENT DOCUMENTS

| | | | |
|---|---|---|---|
| 1,382,045 A | * | 6/1921 | Zigler .................. 152/213 R |
| 1,910,416 A | * | 5/1933 | Wollheim |
| 2,682,907 A | | 7/1954 | Krueger |
| 3,007,506 A | * | 11/1961 | Bowler |
| 3,335,776 A | * | 8/1967 | Peterson |
| 3,770,035 A | * | 11/1973 | Haye, Sr. .................. 206/304.1 |
| 5,439,727 A | * | 8/1995 | Riggs et al. |
| 5,624,509 A | | 4/1997 | Stanley |

FOREIGN PATENT DOCUMENTS

| | | | |
|---|---|---|---|
| CA | 1022444 | * | 12/1977 |
| DE | 2355291 | * | 5/1975 |
| DE | 3236181 | * | 4/1984 |
| JP | 5 9160607 | | 9/1984 |
| JP | 1249503 | | 10/1989 |
| JP | 6-306730 | * | 11/1994 |
| WO | WO 86/00579 | * | 1/1986 |
| WO | WO 9312944 | | 7/1993 |

\* cited by examiner

*Primary Examiner*—Steven D. Maki
(74) *Attorney, Agent, or Firm*—Ladas & Parry LLP (57) ABSTRACT

A device to be fitted on a vehicle wheel in order to increase the friction between the wheel and the road surface during winter conditions, comprises a belt that can encircle the tread of the wheel and be held in place by means of flexible inner and outer side portions. The inner side portion is tightened on the inner side of the wheel by means of an elastic member. The internal circumference of the belt is at least 4% larger, preferably 5–6% larger than the largest circumference of the wheel. The belt can be made substantially of a woven polyamide material. The outer side portion of the device can be fully covering or be provided with one or more openings, and may in addition be provided with radially extending straps in order to facilitate fitting the device to the vehicle wheel or removing it therefrom. A method for such fitting without lifting the wheel from the road surface is also disclosed.

18 Claims, 7 Drawing Sheets

METHOD FOR INCREASING FRICTION BETWEEN WHEEL AND ROAD USING GLIDING PREVENTER

The present invention relates to a device to be fitted on a vehicle wheel of a predetermined size in order to increase the friction between the wheel and the road surface during winter conditions, comprising a belt made substantially from textile material and intended to encircle the tread of the wheel and be held in place by means of flexible inner and outer side portions which, at least on the inner side of the wheel, is tightened by means of an elastic member.

Such a device is known from U.S. Pat. No. 2,682,907, FIGS. 1–3. This known device is symmetrical about its middle plane and is made from a single piece of coarse canvas, which is folded over so that along either of the two outer edges a continuous pocket is formed which receives an elastic member in the form of a helical spring.

The middle portion of the device, which is supposed to constitute the belt to come into contact with the road surface, is by means of glue provided with a coating of aluminium oxide impregnated with abrasive particles in order to substantially increase the friction against the road surface.

The device according to U.S. Pat. No. 2,682,907 is formed to cling quite closely to the vehicle wheel and cannot be put in place on the wheel when the wheel is mounted on a vehicle unless the wheel is raised from the ground. Since the device is symmetrical with flexible side portions having springs included on both sides, the device, e.g. when driving through a curve on a dry road surface, conceivably could creep off the wheel towards the inside thereof and impede the steering mechanism of the vehicle, possibly also damage brake lines. Once the device has moved to the inner side of the wheel, it cannot be removed without destroying the device or removing the wheel from the vehicle.

A purpose of the present invention is to provide a device mentioned in the introductory paragraph, which may be fitted to the wheel of the vehicle even when the wheel is resting on the road surface with the full weight of the vehicle, preferably also when the wheel is stuck in more or less deep snow.

This is obtained according to the invention by making the internal circumference of the belt at least 4% larger than the largest circumference of the wheel. Very surprisingly, it has been found that such an oversize makes it possible to fit the inner side portion over the tread of the wheel to the inner side of the wheel along such a long part of the circumference of the wheel not being in contact with the road surface that, when the wheel thereafter is rotated, e.g. by attempting to drive the car forwards or backwards, the remaining part of the inner side portion will assume its place on the inner side of the wheel and pull the belt in place along the tread of the wheel.

It has also surprisingly been found that with this over-size, which can be permitted to amount up to 8% or more, somewhat depending on the space conditions in the wheel well of the vehicle, the device will stay in place on the wheel even when driving on a clear and winding road at speeds at least as high as common snow chains would permit.

A second purpose of the invention is to provide a device of the type mentioned in the introductory paragraph which will not be able to shift on the wheel so that dangerous driving situations occur.

This is obtained according to the invention by the outer side portion of the device being shaped so that it will not be able to jump over the wheel to the inner side thereof. Here, the outer side portion may e.g. cover the entire outer side of the wheel, or it may be provided with one or more openings, the largest circumference of such an opening being less than 2.2 times the largest diameter of the wheel. Where the outer side portion is so narrow that its opening becomes larger than this, the opening can be limited by means of radially extending straps. These straps may also be suitable as gripping means when the device is to be removed from the wheel after use.

A further purpose of the present invention is to provide a method for fitting a device according to the invention to a vehicle wheel while the wheel is mounted on the vehicle and possibly also is stuck in snow.

This is obtained according to the invention in that the inner side portion is fitted over the tread of the wheel to the inside of the wheel along at least two thirds of the circumference of the wheel, preferably along as much as possible of that part of the circumference which does not rest against the road surface, whereupon the wheel is rotated by means of the vehicle, whereby the remaining part of the inner side portion moves to assume its place on the inside of the wheel and pulls the belt in place along the tread of the wheel.

Further advantageous features of the invention will appear from the following description of the exemplifying embodiments schematically shown on the dependent drawings, wherein:

FIGS. 2A,B,C are views similar to FIGS. 1A,B,C of a second embodiment of the invention, except that the wheel is removed from FIGS. 2A and 2B;

In the various embodiments shown in the above mentioned figures, the same reference numerals have been used on like or corresponding parts.

Figure 1A:
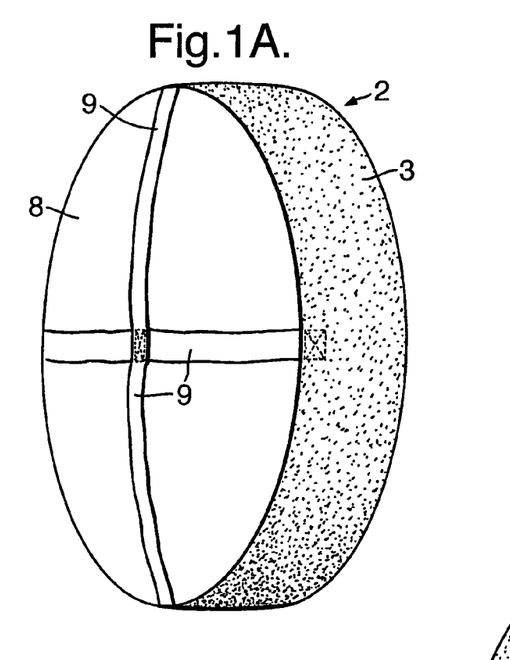
FIGS. 1A,B,C are a perspective view of a vehicle wheel provided with a first device according to the invention seen from the outside, a perspective view of the wheel in FIG. 1A seen from the inner side, and a partial radial cross-section through the wheel in FIG. 1A, respectively.
Figure 1B:
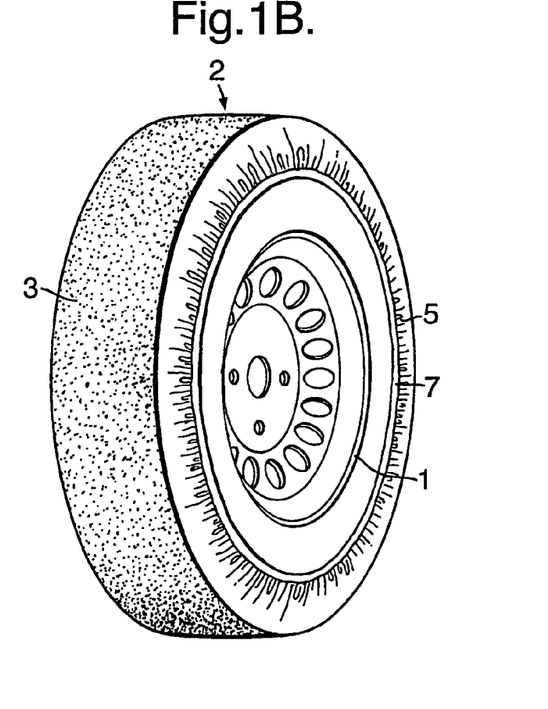
Figure 1C:
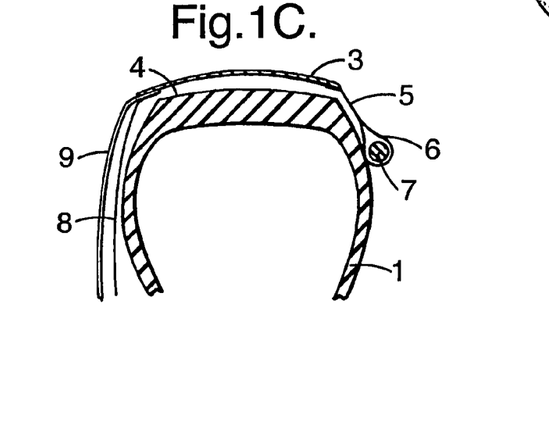

FIGS. 1A–C shows a vehicle wheel 1 provided with a first embodiment of the device according to the invention. This device 2 comprises a belt 3 which is to encircle the tread 4 of the wheel with a certain clearance therebetween over at least a part of the portion of the belt 3 which is not located between the wheel and the road surface. This clearance results from the inner circumference of the belt being 4–10%, preferably 5–6% larger than the largest circumference of the wheel 1. The belt 3 may consist of a textile material, preferably made of a polymer. A woven textile of polyamide has turned out to be particularly suitable, combining high strength with very good adhesion to a snow covered surface. One such material is commercially available under the trade name Cordura 1000.

On the side of the belt 3 facing the tread of the wheel 4 its textile material may advantageously be coated with a suitable plastic, e.g. polyurethane rubber, in order to strengthen and stabilise the material and reduce the friction against the tread of the wheel.

Even though a woven textile has been found suitable as belt material, it will be understood that also other materials can turn out to be suitable, e.g. more or less stabilised felt materials. It will also be understood that the outer side of the belt may be provided with a friction increasing coating. The device according to the invention can be made reversible, the belt on one side having a surface which is suitable for driving on snow, while the other side has a surface for better gripping ability on ice.

Furthermore, the device 2 is provided with an inner side portion 5 which in the embodiment shown consists of a lighter and more flexible textile material than the belt 3 and which is sewn or in another suitable way is attached to the belt 3 along one of its longitudinal edges. The inner side portion may on its inside advantageously be provided with a low friction coating, preferably silicone polymer, butadiene rubber, neoprene rubber, PVC or similar polymer. Such a low friction coating makes it easier to fit the device 2 in place on the wheel 1 during the mounting.

The free edge of the inner side portion 5 is provided with a longitudinal pocket 6, in which an elastic element 7 is placed, here in the form of a multi-thread rubber band covered by a sheathing spun of relatively smooth thread material. The purpose of the sheathing is, firstly, to reduce the stretchability of the rubber band and, secondly, to reduce the friction between the rubber band and the inside of the pocket 6. The low friction on this point is important for the unhindered adaptation of the rubber band in the pocket 6 when the rubber band is stretched during the fitting of the device onto the tire and for reducing the potentially destructive friction forces when the pocket with the rubber band is driven over by the wheel 1 during the last phase of the fitting of the device 2. (It will be understood that the spring shown in U.S. Pat. No. 2,682,907 and its pocket easily will be damaged if it were to be driven over in such a way.)

From FIG. 1A it appears that on its outer side the device 2 is provided with a fully covering side portion 8. It is also made of a partly coated textile material, e.g. of the type Cordura, but in a lighter quality than the belt 3.

The outer side portion is provided with two diamtrically extending orthogonal straps 9, which in addition to being attached to the outer side portion and possibly also the belt 3 at their ends, also are attached to each other and to the middle of the outer side portion 8. The straps 9 serve the purpose of facilitating removal of the device 2 after use and will, in addition, have a reinforcing effect. It will be understood that the straps 9 may be arranged in different numbers, e.g. three radial straps may be used. The straps may also advantageously be made of a polymer so that the entire device 2 will consist of materials that neither rust nor rot if it is stored in a wet condition.

Figures 2A, 2B, 2C:
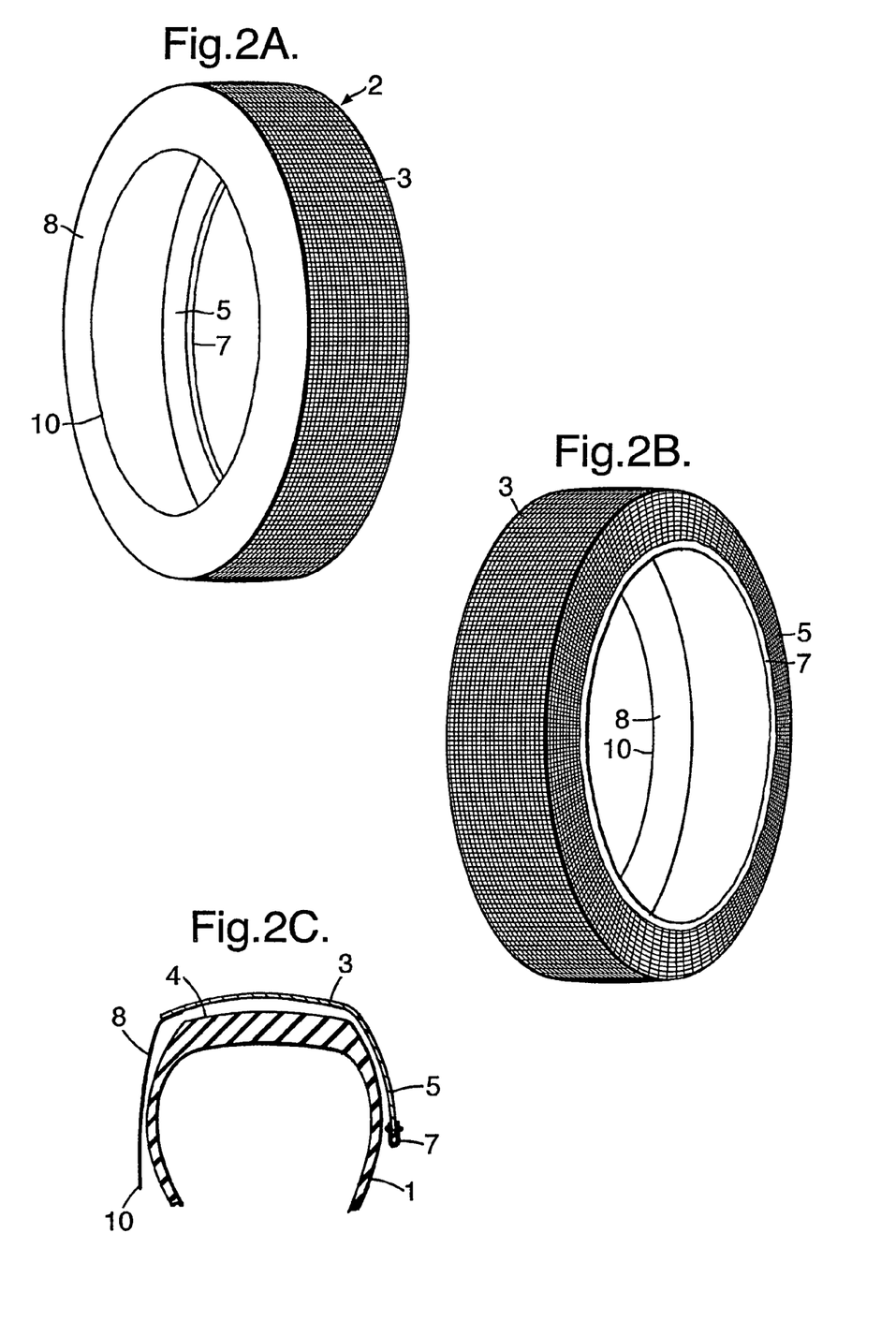

In FIGS. 2A–C there is shown a second exemplifying embodiment of a device according to the invention. The belt 3 and the inner side portion 5 are here made of one and the same piece of textile material. The elastic member 7 is constituted by a band which is woven, spun or knitted from a rubber elastic thread material and a substantially inelastic thread material, so that the latter thread material limits the extendability of the elastic member 7. The band can have a width of about 5 cm and be of a type which is used for suspenders or belts. The band is doubled and is in tensioned condition sewn to the free edge of the inner side portion 5. This avoids a pocket with a concealed rubber band that cannot be inspected for damage or wear.

In this case the outer side portion 8 has a relatively large central opening. However, the free edge 10 of the side portion 8 has a circumference that is less than 2.2 times the largest diameter of the wheel 1 for which the device is to be used. In this embodiment, the outer side portion 8 radially extends from an internal circumference of the belt 3 toward the center of the wheel over a length which equals at least 17% of the largest internal diameter of the belt. Considering that the tread 4 of the wheel is about 20% of the diameter of the wheel, an opening limited in this way will not be able to jump over the wheel to bring the device in its entirety on the inner side of the wheel. The free edge 10 can be reinforced in a suitable manner.

Figure 3A:
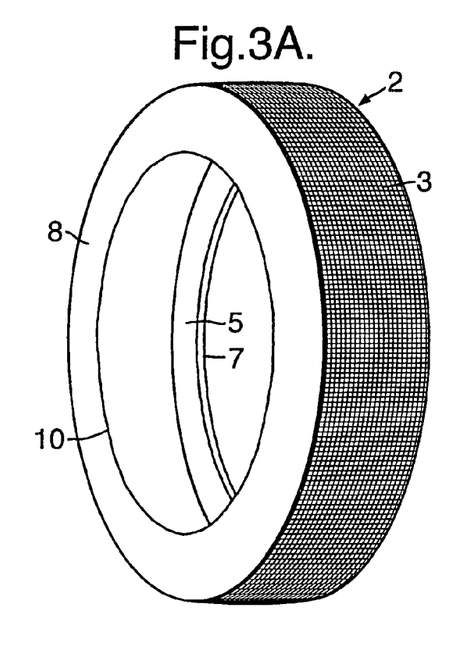
FIGS. 3A,B,C are views similar to FIGS. 2A,B,C of a third embodiment according to the invention.
Figure 3B:
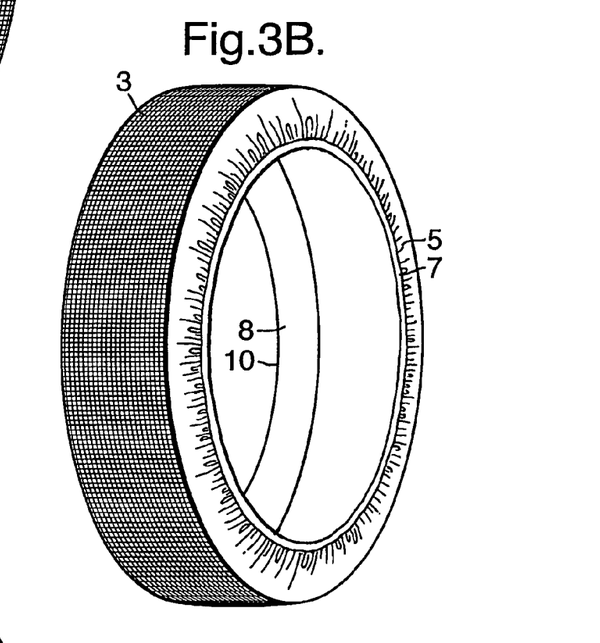
Figure 3C:
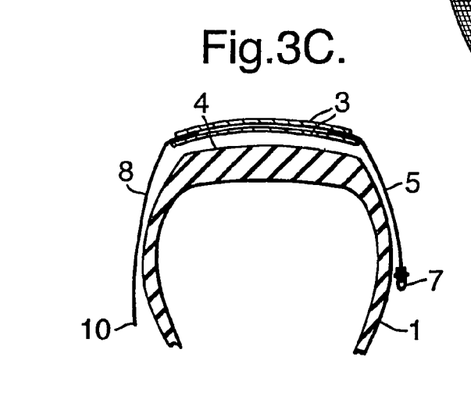

In the third exemplifying embodiment illustrated in FIGS. 3A–C the belt 3 is made of two layers of textile material, e.g. the Cordura 1000 mentioned above, coated with polyurethane rubber on one side. Here the layers are placed so that the sides coated with polyurethane rubber face each other in the middle portion of the belt. The outer layer will thereby have the possibility of sliding somewhat against the inner layer, the effect being to reduce the strains on the belt when driving on an uneven surface, e.g. over sharp stones.

Here, the inner and outer side portions 5, 8 are sewn to the belt 3 and consist of a textile material of a lighter quality than the belt. The elastic member 7 is a band as described above in connection with the second exemplifying embodiment.

Figure 4A:
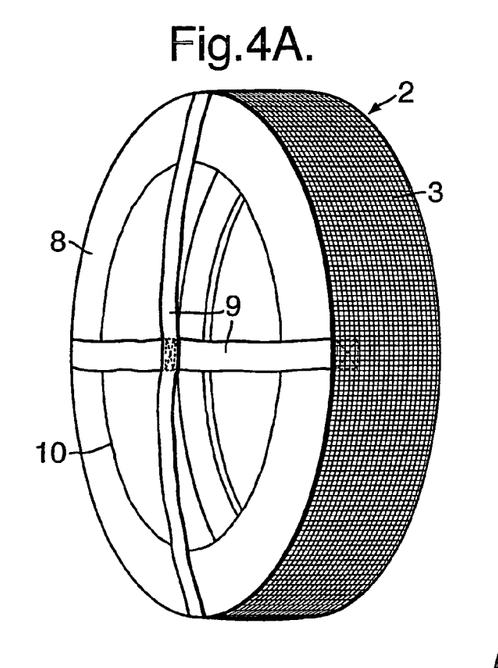
FIGS. 4A,B to 7A,B are views similar to FIGS. 2A and 2B of a fourth to seventh embodiment, respectively, of the device according to the invention.
Figure 4B:
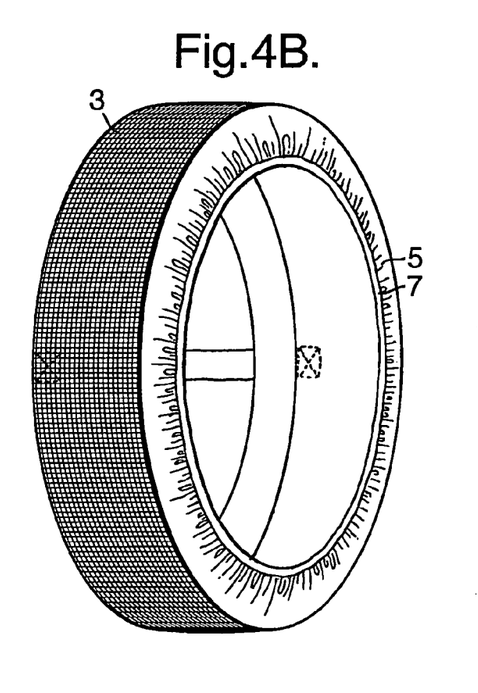

FIGS. 4A,B show an exemplifying embodiment similar to that of FIGS. 3A–C, except that the outer side portion 8 is provided with two crossed straps 9, as is also shown in connection with FIG. 1A.

Figure 5A:
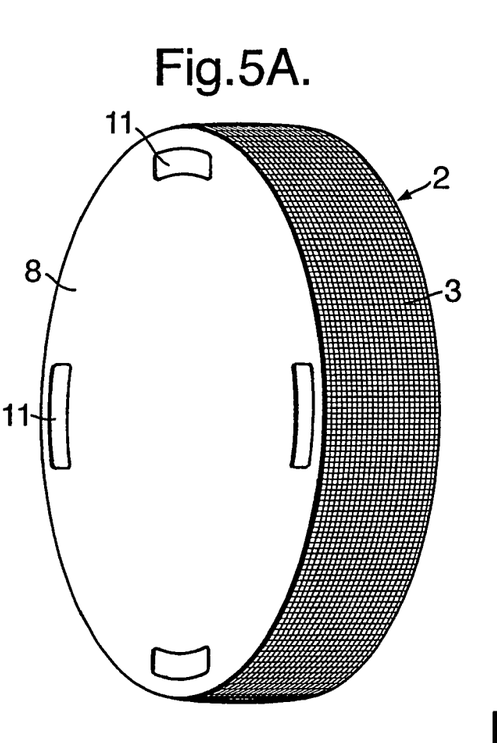
Figure 5B:
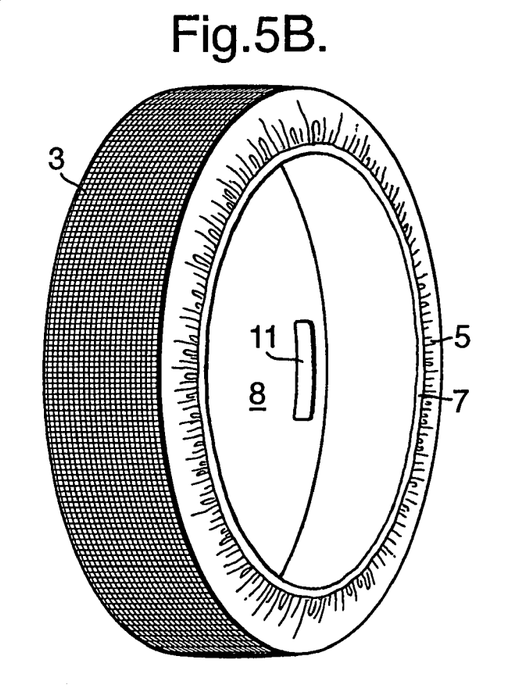

In the fifth exemplifying embodiment shown in FIGS. 5A,B the outer side portion 8 is essentially fully covering, but is provided with four openings 11 which are large enough to serve as grips when the device 2 is to be stabilised during mounting or pulled off after use.

Figure 6A:
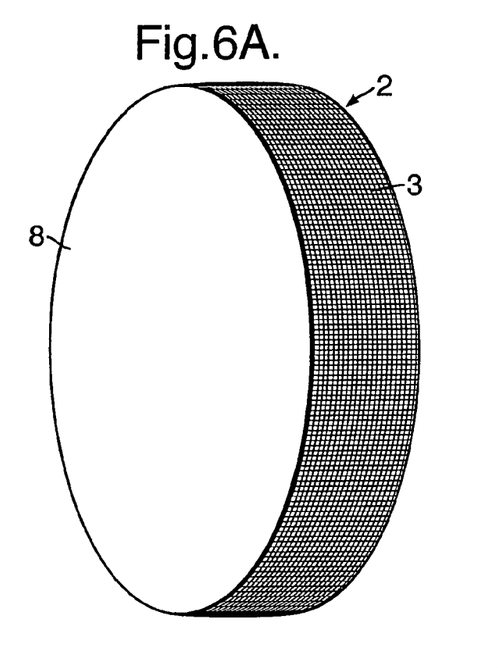
Figure 6B:
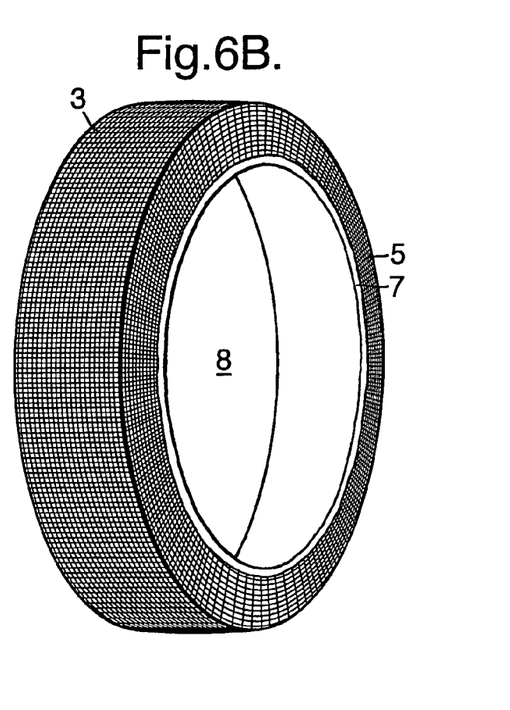

FIGS. 6A,B shows an exemplifying embodiment where the belt 3 and the inner side portion 5 is constituted by one and the same textile material, while the outer side portion 8 is fully covering.

Figure 7A:
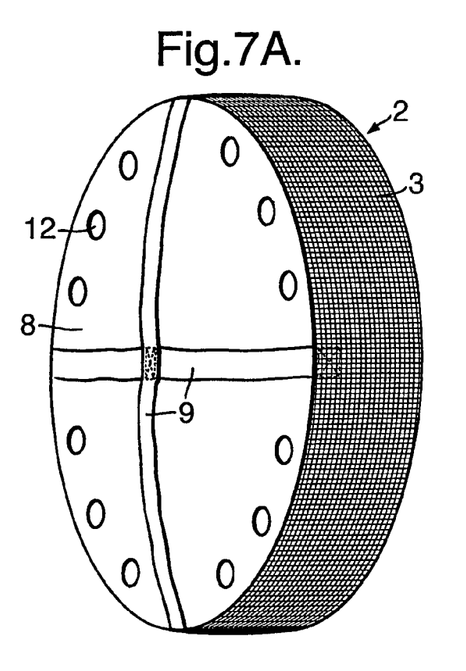
Figure 7B:
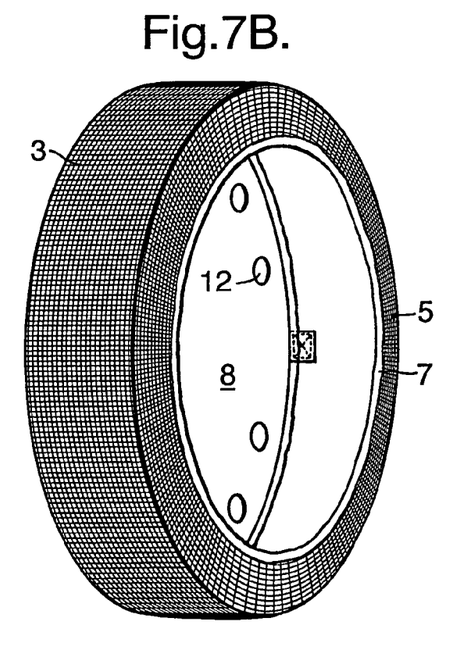

The exemplifying embodiment in FIGS. 7A,B has its staring point in the example of FIGS. 6A,B, but the outer side portion 8 is provided with ventilation holes 12 along the outer edge and also two crossed straps 9. During driving the outer side portion 8 may have a tendency to act as a centrifugal pump so that the device 2 is inflated. This effect may be advantageous when driving in loose snow because the air blown out along the free edge of the inner side portion 5 prevents the snow from penetrating into the device 2. If, on the other hand it is desirable that the device cling closer to the wheel, e.g. in case of narrow space conditions in the wheel well, the ventilation holes 12 may be advantageous.

Further development of the invention has suggested that the outer side portion of the device preferably may be made from a netting material, thus obviating any additional ventilation holes. For example, the netting may be made of PVC coated 1100 dtex polyester multifilament material. The netting openings may have an opening side length of 2–7 mm, preferably about 4 mm. Furthermore, there is reason to believe that polyester may be a suitable material also for the belt 3 of the device according to the invention. One envisions a belt of a multilayer construction, the outer surface comprising polyester multifilament yarn oriented crosswise to the circumferential direction of the belt. The yarn may have a fineness of about 1100 dtex, and the layer construction pattern could be 4-shed broken twill.

Furthermore, it is envisioned that the multilayer construction has an inner layer with a colour or colour pattern which is different from that of the outer layer or layers. Such a differently coloured inner layer, which may be made of polyester or polyamide, will appear when the outer layers are worn through and thereby serve as a wear indicator helping to prevent the situation where the device would separate in the circumferential direction into two parts.

Finally, it is envisioned that the outer and inner layers of the belt are interconnected by a common yarn system in said circumferential direction. Also in this case a yarn of polyester multifilament of about 1100 dtex is expected to be suitable.

It will be understood that according to the invention, a device has been provided which is simple and inexpensive to produce. It is environmentally desirable since it does not cause noise and vibrations or wear on the road surface during use and also since it is made of recyclable materials. The device provides good gripping ability on dry and wet snow and ice, even better than a good studded tire. It is very simple to fit onto and remove from the wheel, and it is comfortable to handle even in cold weather. Even though the device primarily is intended for use in difficult driving situations of a temporary nature, it has proven itself to be very durable. Thus, a prototype mounted on the driven wheels of a vehicle was driven a distance of 30 km at speeds varying between 60 and 70 km per hour, mostly on dry asphalt, which gives the highest wear. Both devices kept stably in place and were intact after the driving. Nevertheless, should the entire or parts of the device for one reason or another fall off during driving, due to its limited weight and soft character it will not do much damage to the vehicle or the surroundings. It will also be understood that the device according to the invention is not limited to the exemplifying embodiments described above, but that it may be modified and varied by the skilled person within the scope of the appended claims.

The invention claimed is:

1. A method for fitting a device on a vehicle wheel, resting against a road surface, to increase the friction between the wheel and the road surface during winter driving conditions, comprising the steps of:
   providing a device comprising an endless annular belt made substantially from textile material and intended to encircle the outer circumference of the wheel; a flexible inner side portion; and a flexible outer side portion which is disposed against the outer side surface of the wheel when the device is fitted on the wheel, so that the device is kept stably in place on the wheel; wherein only the flexible inner side portion of the device has an elastic member, the flexible inner side portion being tightened against the inner side surface of the wheel by the elastic member when the device is fitted on the wheel;
   fitting the inner side portion of the device over the outer circumference of the wheel to the inner side surface of the wheel along as much as possible of that part of the outer circumference which does not rest against the road surface; and
   rotating the wheel by means of the vehicle, whereby the remaining part of the inner side portion of the device moves over the outer circumference of the wheel to fit on the inner side surface of the wheel and pulls the belt in place along the outer circumference of the wheel.

2. The method according to claim 1, wherein the outer side portion of the device is designed to cover substantially the outer side surface of the wheel.

3. The method according to claim 2, wherein the outer side portion of the device is made of a netting material.

4. The method according to claim 3, wherein the netting material is a PVC coated 1100 dtex polyester multifilament material having a netting opening of 2–7 mm.

5. The method according to claim 1, wherein the outer side portion of the device has at least one opening, the largest circumference of said opening being less than 2.2 times the largest diameter of the wheel.

6. The method according to claim 1, wherein the outer side portion of the device is provided with radially extending straps.

7. The method according to claim 1, wherein said elastic member comprises a rubber-elastic material which is covered by a spun, woven or knitted substantially inelastic thread material, said thread material limiting the extensibility of said elastic member.

8. The method according to claim 1, wherein said textile material is a woven polyamide.

9. The method according to claim 1, wherein the belt comprises two layers of textile material, one side of each layer being coated with a suitable plastic, the two layers being arranged so that the plastic coatings contact one another.

10. The method according to claim 9, wherein the inner layer of the multilayer construction is a different color than that of the outer layer.

11. The method according to claim 1, wherein the belt is of a multilayer construction, the outer surface comprising polyester multifilament yarn oriented crosswise to the circumferential direction of the belt.

12. The method according to claim 11, wherein the polyester multifilament yarn has a fineness of about 1100 dtex.

13. The method according to claim 10, wherein the layers are made of a polyester or polyamide multifilament material.

14. The method according to claim 10, wherein the outer and inner layers are interconnected by a common yarn system in said circumferential direction.

15. The method according to claim 14, wherein the said common yarn system is made of a polyester multifilament having a fineness of about 1100 dtex.

16. The method according to claim 1, wherein the inside of the inner side portion of the device is coated by a low friction coating.

17. The method according to claim 16, wherein said low friction coating Is one selected from the group consisting of: silicone polymer, butadiene rubber, neoprene rubber, and PVC.

18. The method according to claim 1, wherein the outer side portion radially extends from an internal circumference of the belt toward the center of the wheel over a length which equals at least 17% of the largest internal diameter of the belt.

* * * * *